United States Patent [19]

Marius

[11] 4,331,433
[45] May 25, 1982

[54] CYCLE GEAR-CHANGER

[75] Inventor: Huret R. H. Marius, Nanterre, France

[73] Assignee: Etablissements Huret & Fils, Nanterre, France

[21] Appl. No.: 98,081

[22] Filed: Nov. 28, 1979

[30] Foreign Application Priority Data

Apr. 23, 1979 [FR] France .................................. 79 10236

[51] Int. Cl.³ .......................................... F16H 11/00
[52] U.S. Cl. ...................................... 474/79; 403/158
[58] Field of Search ................. 403/158, 159; 474/82, 474/81, 80, 79, 78; 74/406, 411

[56] References Cited

U.S. PATENT DOCUMENTS

| 2,598,557 | 5/1952 | Juy | 474/80 |
| 3,785,219 | 1/1974 | Anthamatten | 474/81 |
| 4,198,874 | 4/1980 | Nagano et al. | 474/82 |

*Primary Examiner*—C. J. Husar
*Assistant Examiner*—Conrad Berman
*Attorney, Agent, or Firm*—Seidel, Gonda, Goldhammer & Panitch

[57] ABSTRACT

The invention concerns a gear-changer for a cycle comprising a support transversely movable with respect to a free wheel of the cycle, and a yoke which is pivotally movable on an axle of the support, this yoke rotatably supporting two rollers, one called "a chain tension roller" and the other "a chain guide roller".

3 Claims, 2 Drawing Figures

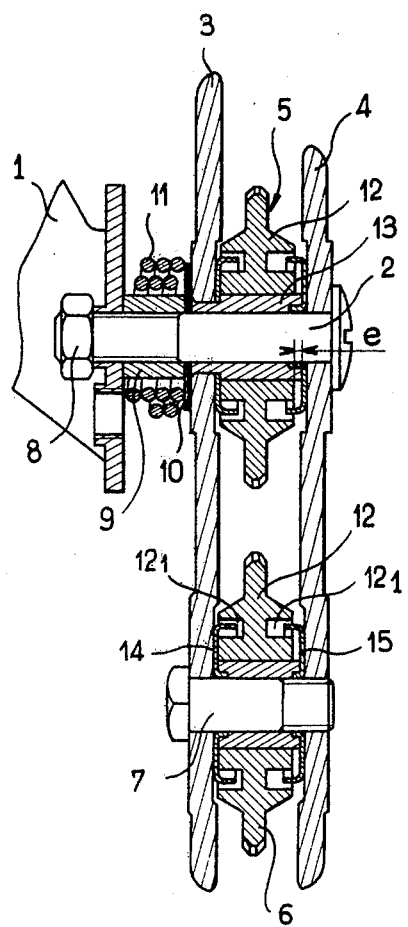
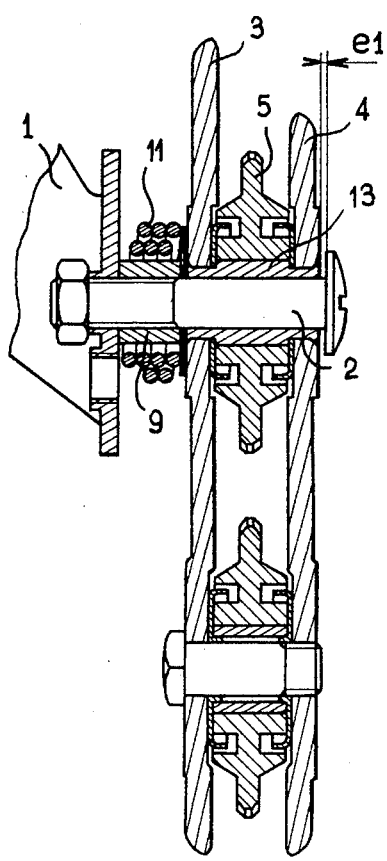
FIG_1  FIG_2

CYCLE GEAR-CHANGER

The invention relates to a cycle gear changer.

Gear-changers for cycles generally comprise a support, fixed, for example, to the framefork which receives the back wheel of the cycle, the support carrying a yoke provided with a chain adjuster roller and a chain guide roller.

The support, which comprises a deformable parallelogram, is controlled by a sliding axle or by any other device actuated by means of a lever and a cable, so as to displace the yoke laterally and to place the rollers of this yoke into the plane of one or other of the gear wheels of the free wheel of the rear wheel of the cycle.

These gear-changers have been the subject of numerous patent applications but they all have a disadvantage which lies in the difficulty of accurately positioning the gear-changing rollers after each gear change, in the plane of a pinion of the free wheel of the rear wheel.

Thus, with these gear-changers, and owing to this poor adjustment, the chain may make an inopportune break from the selected pinion of the free wheel causing an irregular power connection to the rear wheel of the cycle and premature wear of the chain.

In order to remove these drawbacks, it has already been suggested to make the supports of the gear-changers so that they can be freely displaced between two limits for each of the selected positions of the gear-changer, and thus the chain compels the gear-changer to be placed correctly on the support within the limits provided by the construction.

However, this method is complex and cumbersome and causes an undesirable play in the actuating cables.

The object of the present invention is to remove these disadvantages and for this purpose the present invention provides a gear-changer for a cycle, comprising a support transversely movable with respect to a free wheel of the cycle, a yoke or fork-joint pivotally movable on an axle of the support, this yoke rotatably supporting two rollers, one called "a chain tension roller" and the other "a chain guide roller", this gear-changer being characterised in that the rollers are movable laterally with respect to the support.

According to another characteristic of the invention, the rollers are movable laterally with respect to the yoke.

According to another feature of the invention, the yoke is movable laterally with respect to the support.

The present invention will now be further described, by way of example, with reference to the accompanying drawings, in which:

FIG. 1 is a sectional view of a first embodiment of a gear-changer according to the present invention, this section being taken along the support axle of the yoke of this gear changer; and FIG. 2 is a section similar to that of FIG. 1 of another embodiment of a gear-changer constructed according to the present invention.

The present invention relates to the simple realisation of a gear-changer which provides for the automatic control of the position of the chain in the plane of a selected pinion of a free wheel, without any increase in the weight and bulk of the unit.

In the embodiment of FIG. 1, the gear-changer consists of a support 1 which is fixed to the fork of the rear wheel and a yoke which is constituted for example, as known, by a deformable parallelogram which, when it is actuated, ensures the displacement of the driving chain of the cycle from one of the pinions of the free wheel to another.

The yoke has two arms 3 and 4 which border the chain guide roller 5 and the chain tension roller 6, and are fixed on the support 1. The chain tension roller 6 is mounted between the two arms 3 and 4 of the yoke by means of a screw 7 while the guide chain roller 5 is mounted between these two arms by a screw 2 which serves for mounting the yoke and the rollers on the support, the screw 2 being, for this latter purpose, fixed on the support by means of a screw nut 8.

A cross-piece 9 and small rings 10 are placed between the support 1 and the arm 3, the cross-piece 9 being surrounded by a two layer spiral spring 11, which is hooked on the one hand to the support 1 and on the other hand to the arm 3, and which tends constantly to make the arms 3 and 4 of the yoke pivot about the screw 2 so as to allow the roller 6 to exert a resilient pressure on the chain which ensures its tension whatever may be the selected pinion of the free wheel on which this chain is located.

The rollers 5 and 6 each comprise a wheel 12 over which the chain passes, the wheels being each mounted so as to rotate freely on an axle sleeve 13 through which the screw 2,7 extends.

In accordance with the invention, however, the wheel 12 can be displaced axially with respect to the axle sleeve 13, and so that this can be achieved the axle sleeve 13 is longer than the width of the wheel 12 by the distance e. Thus the wheel 12 can be freely displaced up to a distance e, under the action of the chain so that these wheels 12 are placed accurately in the plane of the selected pinion of the free wheel.

On each side of these rollers 5 and 6 are provided cups 14 and 15 the outer edges of which are lodged in annular grooves provided on the lateral faces of the wheels 12. This arrangement is intended to protect the axle sleeve 13 against impurities which could be deposited thereon and to avoid especially the deposition of these impurities on the exposed part of the axle sleeve 13, which deposition might hinder the free lateral displacement of the wheel 12.

In the example illustrated in FIG. 1, the lateral displacement of the rollers 5 and 6 with respect to the support 1 is obtained by a lateral displacement of the wheels 12 of the rollers with respect to the arms 3 and 4 of the yoke. However, in the example in FIG. 2, this lateral displacement of the rollers with respect to the support is obtained by displacing the whole yoke and rollers with respect to the support.

In this latter case, the screw 2 is not used to hold arms 3 and 4 of the yoke, the roller 5 and the cross-piece 9, against the support 1, but on the contrary allows the displacement of the yoke over a distance el so that the chain by acting on the roller 5 or on the inside faces of the arms 3 and 4 of the yoke, can make the axle sleeve 13 and then the whole yoke and rollers, slide on the cylindrical span of the screw 2 which is fixed with respect to the support 1. In order to allow this lateral displacement of the yoke and the rollers on the screw 2, the ends of the spring 11 are hooked on the support 1 or on the arm 3, with an amount of play equal to the amount of possible displacement.

I claim:

1. A gear-changer for a cycle comprising a support movable transversely with respect to a cycle free wheel, said support having an axle, and a yoke, said yoke rotatably supporting two rollers each by means of a sleeve, one roller being a chain tension roller and the other roller being a chain guide roller, the yoke and the chain guide roller sleeve being pivotably movable about said axle, wherein the length of the chain guide roller sleeve and the chain tension roller sleeve is dimensioned so as to predetermine a lateral displacement of the two rollers with respect to said axle in a direction parallel to said axle.

2. A gear-changer according to claim 1, wherein the length of the two sleeves is dimensioned so as to predetermine the lateral displacement of the two rollers, the sleeves and the yoke with respect to the axle.

3. A gear-changer according to claim 1, wherein each roller has an annular groove provided on each lateral face thereof, and further comprising cup means arranged on each lateral side of the rollers between the sleeves and the yoke, each cup means encircling said sleeves and having edges thereof arranged in the associated annular groove.

* * * * *